(12) United States Patent
Bishop et al.

(10) Patent No.: US 10,303,790 B2
(45) Date of Patent: *May 28, 2019

(54) PROCESSING UN-TYPED TRIPLE STORE DATA

(71) Applicant: International Business Machines Corporation, Armonk, NY (US)

(72) Inventors: Timothy A. Bishop, Minneapolis, MN (US); Stephen A. Boxwell, Columbus, OH (US); Benjamin L. Brumfield, Cedar Park, TX (US); Stanley J. Vernier, Grove City, OH (US)

(73) Assignee: International Business Machines Corporation, Armonk, NY (US)

(*) Notice: Subject to any disclaimer, the term of this patent is extended or adjusted under 35 U.S.C. 154(b) by 291 days.

This patent is subject to a terminal disclaimer.

(21) Appl. No.: 15/176,198

(22) Filed: Jun. 8, 2016

(65) Prior Publication Data

US 2017/0357690 A1    Dec. 14, 2017

(51) Int. Cl.
*G06F 17/30*          (2006.01)

(52) U.S. Cl.
CPC .. *G06F 17/30448* (2013.01); *G06F 17/30389* (2013.01); *G06F 17/30976* (2013.01)

(58) Field of Classification Search
CPC ......... G06F 17/30448; G06F 17/30389; G06F 17/30976
See application file for complete search history.

(56) References Cited

U.S. PATENT DOCUMENTS

| | | | |
|---|---|---|---|
| 7,392,185 B2 | 6/2008 | Bennett | |
| 8,527,517 B1* | 9/2013 | Ait-Mokhtar | G06F 17/30292 707/738 |
| 9,037,464 B1 | 5/2015 | Mikolov et al. | |
| 2013/0346445 A1* | 12/2013 | Mizell | G06F 17/30908 707/774 |
| 2015/0039292 A1 | 2/2015 | Suleman et al. | |
| 2015/0278264 A1 | 10/2015 | Balani et al. | |
| 2016/0048561 A1 | 2/2016 | Jones et al. | |
| 2016/0055261 A1* | 2/2016 | Reinhardt | G06F 17/30958 707/798 |
| 2016/0098456 A1 | 4/2016 | Contreras et al. | |
| 2016/0224637 A1* | 8/2016 | Sukumar | G06F 17/30539 |

OTHER PUBLICATIONS

IBM Appendix P, list of patents and patent applications treated as related, Jun. 8, 2016, 2 pages.

(Continued)

*Primary Examiner* — Alexander Khong
(74) *Attorney, Agent, or Firm* — Bryan D. Wells (57) ABSTRACT

A method, executed by a computer, includes receiving a triple comprising a predicate, a first entity and an un-typed second entity, scanning a collection of triples for triples that match the predicate of the triple to produce similar triples, determining frequency information for second entity types referenced by the similar triples, and processing the un-typed second entity using the frequency information. A computer system and computer program product corresponding to the method are also disclosed herein.

20 Claims, 7 Drawing Sheets

(56) References Cited

OTHER PUBLICATIONS

Disclosed Anonymously et al., "Answering Predictive Questions using Prediction Accuracy Profiles", An IP.com Prior Art Database Technical Disclosure, IP.com No. IPCOM000237220D, IP.com Electronic Publication Date: Jun. 9, 2014, 4 pages.

"About: Al-Aqsa Foundation (http://dbpedia.org/resource/Al-Aqsa_Foundation)", printed on Apr. 21, 2016, 4 pages, <http://dbpedia.org/page/Al-Aqsa_Foundation>.

"About: Cherie Blair (http://dbpedia.org/resource/Cherie_Blair)", printed on Apr. 21, 2016, 7 pages, <http://dbpedia.org/page/Cherie_Blair>.

"About: English language (http://dbpedia.org/resource/English_language)", printed on Apr. 21, 2016, 69 pages, <http://dbpedia.org/page/English_language>.

"About: headquarters (http://dbpedia.org/property/headquarters)", printed on Apr. 21, 2016, 1 page, <http://dbpedia.org/property/headquarters>.

"About: http://dbpedia.org/class/yago/Woman110787470 (http://dbpedia.org/class/yago/Woman110787470)", printed on Apr. 21, 2016, 20 pages, <http://dbpedia.org/class/yago/Woman110787470>.

"About: spouse (http://dbpedia.org/property/spouse)", printed on Apr. 21, 2016, 1 page, http://dbpedia.org/property/spouse>.

"About: Tony Blair (http://dbpedia.org/resource/Tony_Blair)", printed on Apr. 21, 2016, 10 pages, <http://dbpedia.org/page/Tony_Blair>.

"The RDF Concepts Vocabulary (RDF)", printed on Apr. 21, 2016, 3 pages, <http://www.w3.org/1999/02/22-rdf-syntax-ns#>.

Jurafsky et al., "Speech and Language Processing, Chapter 28 Question Answering", Copyright © 2014, Draft of Feb. 10, 2015, 20 pages, <https://web.stanford.edu/~jurafsky/slp3/28.pdf>.

Mell et al., "The NIST Definition of Cloud Computing", National Institute of Standards and Technology, U.S. Department of Commerce, Special Publication 800-145, Sep. 2011, 7 pages.

\* cited by examiner

300
310A→  <../resource/China>        <../property/capital>   "Beijing"@en ～340A      ↙
       <../resource/France>       <../property/capital>   <../resource/Paris>
       <../resource/England>      <../property/capital>   <../resource/London>
       <../resource/California>   <../property/capital>   <../resource/Sacramento>
       <../resource/Paris>        <../property/type>      <../class/City>
310 →  <../resource/London>       <../property/type>      <../class/City>
       <../resource/Sacramento>   <../property/type>      <../class/City>
       <../resource/China>        <../property/type>      <../class/Country>
       <../resource/France>       <../property/type>      <../class/Country>
310 →  <../resource/England>      <../property/type>      <../class/Country>
       <../resource/California>   <../property/type>      <../class/USState>
       <../resource/Paris>        <../property/type>      <../resource/OlympicCity>
       <../resource/London>       <../property/type>      <../resource/OlympicCity>
310 →  <../resource/Sacramento>   <../property/type>      <../resource/CountySeat>
                    ↑                       ↑                       ↑
                   320                     330                     340

PROCESSING UN-TYPED TRIPLE STORE DATA

BACKGROUND OF THE INVENTION

The present invention relates generally to the field of data processing, and more particularly to processing un-typed string literal data in triples.

Data type information can improve the quality of data processing results. For example, data type information provides useful information when generating candidate answers in a question answering system. Unfortunately, when information appears in string literal form (e.g., in a database) data type information is generally unavailable.

Triple stores, where data is stored as a flat table of "triples" that each comprise a subject, predicate and object, offer a flexible alternative to relational databases. The subject and object are often referred to as "entities" and the predicate defines the (typically one-way) relationship between those entities. For example, the triples "< . . . /resource/France>< . . . /property/city>< . . . /resource/Paris>" and "< . . . /resource/France>< . . . /property/city><. . . /resource/Lyon>" indicate that the entities 'Paris' and 'Lyon' are cities of the entity 'France'. Triple stores provide increased flexibility and do not require the generation of schemas and linking tables previous to conducting information processing tasks on the stored data.

SUMMARY

A method, executed by a computer, includes receiving a triple comprising a predicate, a first entity and an un-typed second entity, scanning a collection of triples for triples that match the predicate of the triple to produce similar triples, determining frequency information for second entity types referenced by the similar triples, and processing the un-typed second entity using the frequency information. A computer system and computer program product corresponding to the method are also disclosed herein.

DETAILED DESCRIPTION

The embodiments disclosed herein recognize that data type information is useful but is often unavailable. The embodiments disclosed herein also recognize that data type information can be estimated from similar data.

Figure 1:
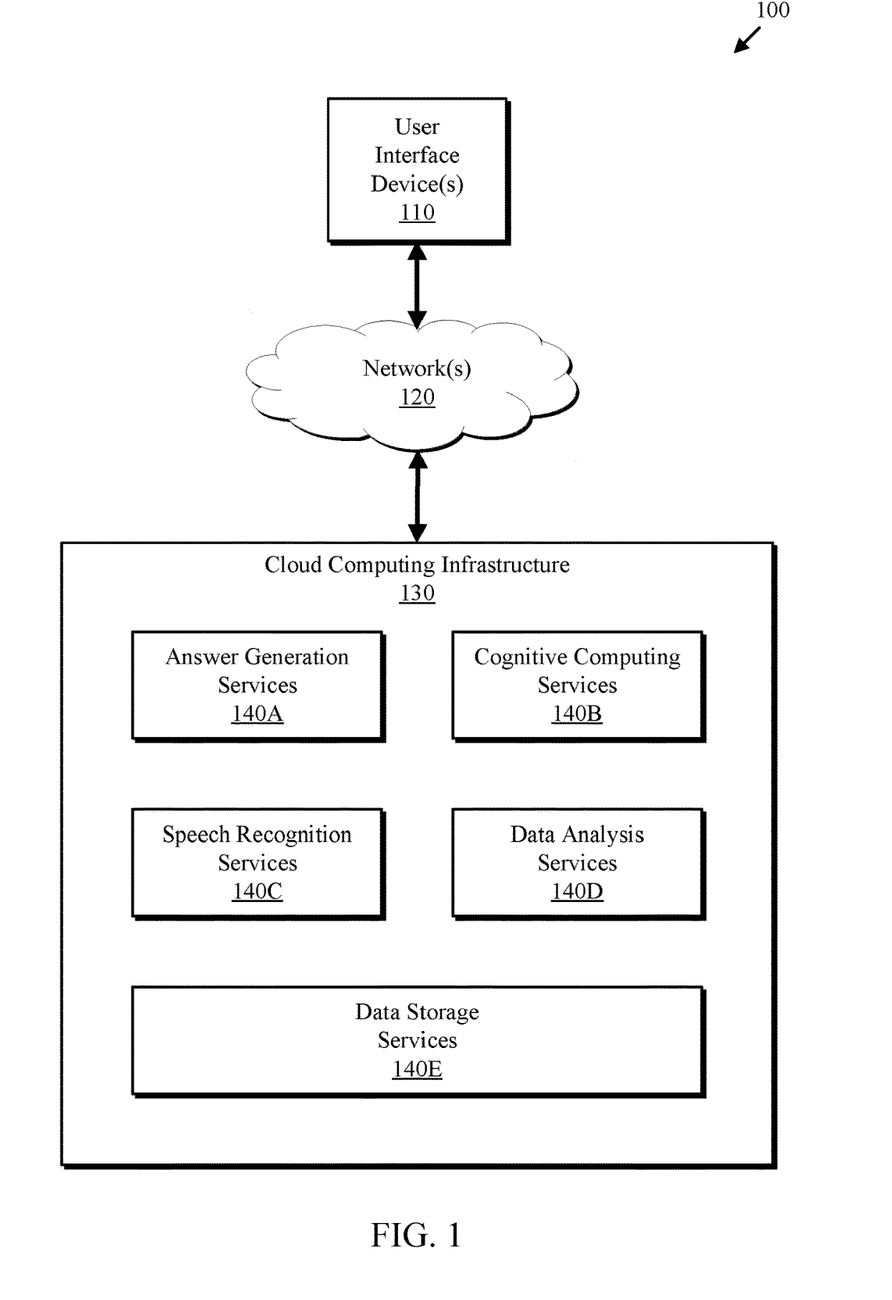
FIG. 1 is a block diagram depicting one example of a cloud computing environment wherein at least one embodiment of the present invention may be deployed.

FIG. 1 is a block diagram depicting one example of a cloud computing environment 100 wherein at least one embodiment of the present invention may be deployed. As depicted, the cloud computing environment 100 includes one or more user interface devices 110, networks 120, a cloud computing infrastructure 130 and various cloud services 140. The cloud computing environment 100 supports a wide variety of data processing tasks.

The user interface devices 110 provide users with interfaces for interacting with computer applications and enable data communications on behalf of those users over the networks 120. Examples of user interface devices include desktop computers and mobile computing devices such as tablets and mobile phones. Examples of the networks 120 include telephone networks and computer networks including intra-networks and inter-networks. In the depicted embodiment, users are able to access the services 140 hosted by the cloud computing infrastructure 130 via the networks 120.

In the depicted embodiment, the services 140 include answer generation services 140A, cognitive computing services 140B, speech recognition services 140C, data analysis services 140D, and data storage services 140E. By leveraging the speech recognition services 140C, users may be able to use natural language to access other services 140 without requiring the use of a computer or display.

One challenge in using the various services 140 is that data sources (not shown) available via the networks 120 and/or the data storage services 140E may not have data that is highly structured or characterized. In response thereto, much effort has been put into automatically determining data types for data elements. One approach to determining data type information is known as type clustering and induction. However, type clustering and induction requires training and is computationally expensive. Various embodiments disclosed herein address at least some of these issues.

For the purpose of simplicity and clarity, the following description describes finding type information for un-typed objects. One of skill in the art will appreciate that the described embodiments may also be used to find type information for un-typed subjects. For example, instances of subject, subject type, object and object type within the description may be replaced with object, object type, subject and subject type, respectively. Alternately, the terms subject and object may be replaced with first entity and second entity, respectively or vice versa.

Figure 2:
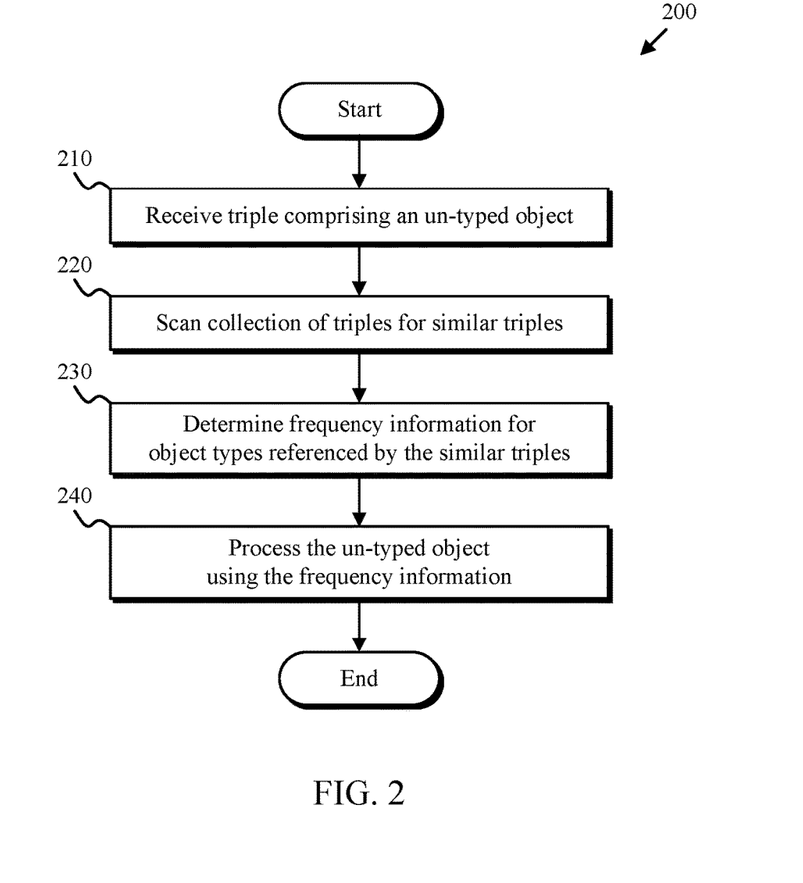
FIG. 2 is a flowchart depicting one example of a data typing and processing method in accordance with at least one embodiment of the present invention.

FIG. 2 is a flowchart depicting one example of a data typing and processing method 200 in accordance with at least one embodiment of the present invention. As depicted, the data typing and processing method 200 includes receiving (210) a triple comprising an un-typed object, scanning (220) a collection of triples for similar triples, determining (230) frequency information, and processing (240) the un-typed object. The data typing and processing method 200 enables effective processing of un-typed data and may be conducted on-the-fly in conjunction with a data processing task.

Receiving (210) a triple comprising an un-typed object may include receiving a triple comprising a subject, a predicate, and an un-typed object. The subject may, or may not be, typed.

Scanning (220) a collection of triples for similar triples may include finding triples within a triple store that match the predicate of the triple. In some embodiments, similar triples are limited to triples that match the predicate of the triple with the un-typed object as well as the subject type of the triple with the un-typed object.

Determining (230) frequency information may include calculating frequency information for object types of objects referenced by the similar triples. For example, each object referenced by the similar triples may have one or more object types that are defined by one or more typing triples in the collection of triples. The frequency information may be a count or percentage of each object type referenced by the similar triples.

Processing (240) the un-typed object may include processing the data for the un-typed object according to the frequency information. For example, a confidence score may be assigned to each object type based on the frequency information. The assigned confidence scores may be used to score candidate questions or answers in a question answering system or some other type of data analysis system. The data processing performed by operation 240 may assume one or more of the various data types that are referenced by the similar triples. The data processing results may be weighted by the confidence score for each data type.

Figure 3:
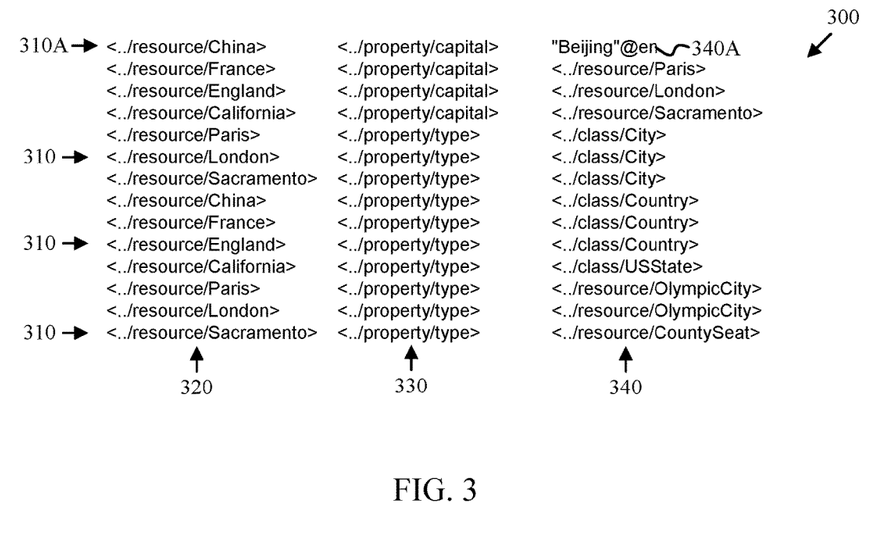
FIG. 3 is a text diagram depicting one example of a collection of triples in accordance with at least one embodiment of the present invention.

FIG. 3 is a text diagram depicting one example of a collection of triples 300 in accordance with at least one embodiment of the present invention. As depicted, the collection of triples 300 includes a variety of triples 310 with subjects 320, predicates 330, and objects 340. The triples 300 may correspond to a relational database.

In the depicted example, the predicates 330 include a 'capital' property for triples that provide information about a capital such as the capital of a country, and a 'type' property for triples the provide data type information. For example, the resource "London" has two potential data types, namely, a 'City' data type and an 'Olympic City' data type. Despite the presence of data type information, the first triple listed in the collection 300, i.e., triple 310A, has an un-typed object 340A, namely "Beijing". The embodiments disclosed herein enable determination of the probable data type for un-typed data elements such as the un-typed object 340A.

Figure 4A:
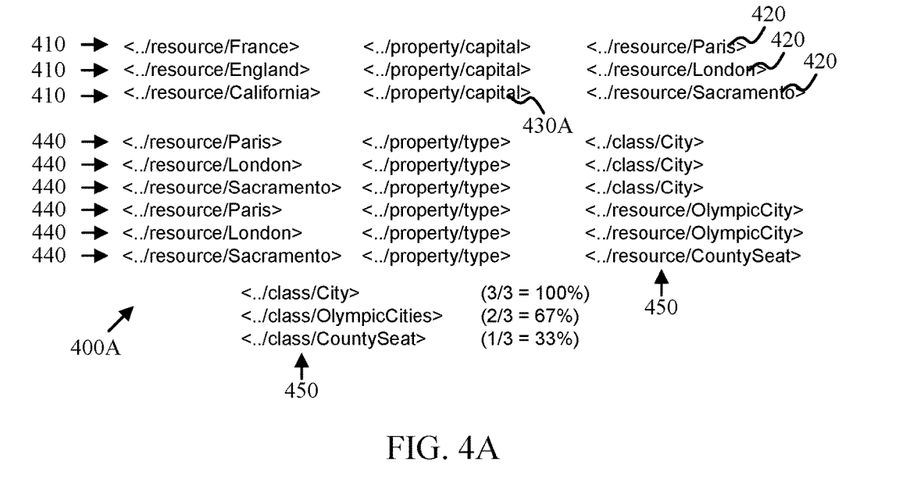
FIGS. 4A and 4B are text diagrams depicting two examples of processed data in accordance with at least one embodiment of the present invention.
Figure 4B:
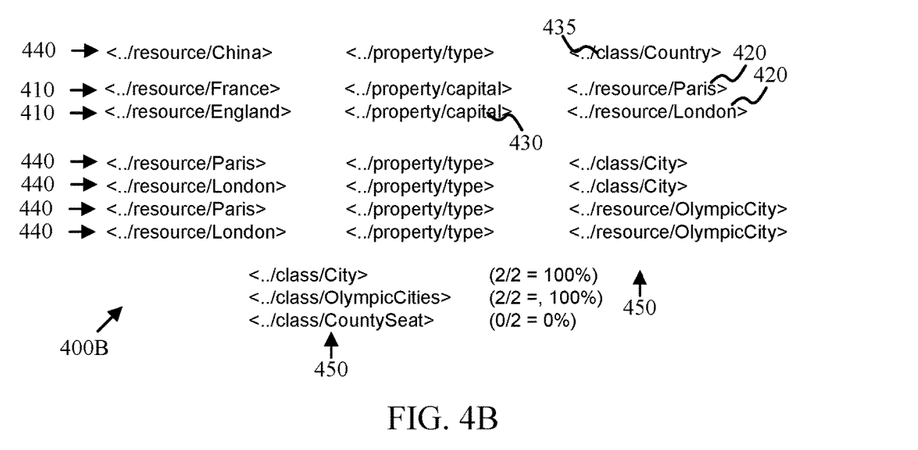

FIGS. 4A and 4B are text diagrams depicting two examples of processed data 400 in accordance with at least one embodiment of the present invention. FIG. 4A shows processed data 400A that includes similar triples 410 that have typed objects 420 and correspond to a selected predicate 430. The similar triples 410 that have typed objects 420 may be selected from the collection of triples 300, or the like. In the depicted example, the selected predicate 430 is the 'capital' property and the typed objects 420 referenced by the similar triples are 'Paris', 'London', and 'Sacramento'.

The processed data 400A also includes typing triples 440 that define the data types 450 for the typed objects 420. In the depicted example, the data types 450 include 'City', 'Olympic City', and 'County Seat'. The data types 450 provide information that may be useful for estimating the data type for the un-typed object 340A shown in FIG. 3. For example, according to the data types 450 shown in FIG. 4A, the un-typed object 340A (i.e., "Beijing") may be assumed to be a 'City' with 100 percent confidence, an 'Olympic City' with 67 percent confidence and a 'County Seat' with 33 percent confidence. In the depicted example, the confidence level is computed by dividing the count of each data type 450 by the count of all similar triples 410. One of skill in the art will appreciate that the depicted example is merely illustrative and that the level of confidence may be selected to be (statistically) dependent on the number of similar triples available for a particular un-typed object 340A.

FIG. 4B shows processed data 400B that includes similar triples 410 that have typed objects 420 and correspond to a selected predicate 430. The selected predicate 430 and a subject type 435 are determined from the triple 310A that contains the un-typed object 340A. In the depicted example, the selected predicate 430 is the 'capital' property, the subject corresponding to the un-typed object is 'China' and the subject type 435 of the subject 'China' is a 'Country' class. The typed objects 420 referenced by the similar triples 410 are 'Paris', 'London', and 'Sacramento'.

The processed data 400B also includes typing triples 440 that define the data types 450 for the typed objects 420. In the depicted example, the data types 450 include 'City', 'Olympic City', and 'County Seat'. The data types 450 provide information that may be useful for determining the data type for the un-typed object 340A shown in FIG. 3. For example, according to the data types 450 shown in FIG. 4B, the un-typed object 340A (i.e., "Beijing") may be assumed to be a 'City' with 100 percent confidence, an 'Olympic City' with 67 percent confidence and a 'County Seat' with 33 percent confidence. One of skill in the art will appreciate that the depicted example is merely illustrative and that the level of confidence may be dependent on the number of similar triples available in a collection of triples.

One of skill in the art will appreciate that the embodiments disclosed herein enable effective processing of un-typed data. For example, in the question: "What woman married Tony Blair?", it is helpful to know that the desired answer is a woman. One way of generating candidate answers is to identify an "anchor" entity in the question (in this case, "Tony Blair") and then identify entities that are of the correct type and that are connected to the anchor entity according to some structured resource. Unfortunately, structured resources (Dbpedia, for example) oftentimes contain inconsistent type information or are missing type information entirely. In this particular example, we hope that we might find the following pair of triples: < . . . /resource/Tony_Blair>< . . . /property/spouse>< . . . /resource/Cherie_Blair> and < . . . /resource/Cherie_Blair><rdf-syntax-ns#type>< . . . /class/yago/Woman110787470> where " . . . " is equal to "http://dbpedia.org".

If we had this pair of triples, then we would know that Tony Blair was connected somehow to Cherie Blair, and the Cherie Blair is of type "Woman", which might be helpful for answering our question. Unfortunately, what we find in Dbpedia is a little different: < . . . /resource/Tony_Blair> < . . . /property/spouse>"Cherie Booth" @en. This triple does contain valuable information that is relevant to our question. Unfortunately, the critical piece of information ("Cherie Booth") is represented here as a string literal, meaning that it is not connected to a disambiguated URI at all. If we wish to obtain type information on Cherie Booth, either via wordnet, yago, or the homegrown dbpedia ontology, we are out of luck. [Note: some of the foregoing terms may be trademarked in various legal jurisdictions.]

At the time of this writing, of the triples that contain the < . . . /property/spouse> relation, 84683 of them yield string literals, while 25334 of them yield disambiguated URIs, meaning that about 75% of all the "spouse" triples are inaccessible to type-based attacks.

This problem shows up often in addresses as well, where location information is represented in a too-specific fashion. Consider a question like "Where is the A1-Aqsa Foundation located?" with the intended answer "Germany", and a corresponding triple like this: < . . . /resource/A1_Aqsa_Foundation>< . . . /property/headquarters>"Aachen, Germany" @en.

We see this in the names of languages too. The "proper" way to represent a language in Dbpedia is < . . . /resource/ English Language>, but in most triples we simply see "English" @en. The solution to this problem, as presented herein, is to use other objects of the database predicate to estimate the type of the string literal. Returning to the "spouse" example, although the triple containing the spouse of Tony Blair makes use of a string literal, there are many triples with that same predicate that use a full URI. We look for other "spouses" in the database, and find that they are often of type "Person", "Man", "Woman", "Physical Entity", and so on.

Continuing the "spouse" example. Suppose we find ourselves again with the triple < . . . /resource/Tony_Blair> < . . . /property/spouse>"Cherie Booth" @en. We can now make a database call equivalent to the following:

SELECT ?type (COUNT(DISTINCT ?obj) AS ?count)
WHERE{?subj  <http://dbpedia.org/property/spouse>?obj.?obj rdf:type ?type}
ORDER BY DESC(?count)

This will obtain the type information for entities that are the object of the "spouse" relation. We could further restrict this query based on the type of the subject (reflecting that political figures tend to marry other political figures). We notice in this list that spouses are often of type "Person", "Actor", "Communicator", etc. Therefore, we hypothesize that string literals that appear as objects of the dbpedia "spouse" relation are probably of those types too. Therefore, when we see the string literal "Cherie Booth" come back as the object of the "spouse" relation, we assume that this string literal has the type "Person", "Actor", "Communicator", etc. This means that if we ask a question like "Who married Tony Blair", we can accurately generate this as a candidate answer.

Now let us take this a step further. We might further note a correlation in the dbpedia data. Continuing on the "spouse" example: DbPedia contains a type "Monarch": there are approximately 13722 entities that are identified as such. Of these, there are 7427 that have a "spouse" entry. Of these spouses, 4608 of them are full dbpedia entities (having full URIs and possibly types), and the remainder are string literals. Of those 4608 spouses, 2784 are monarchs themselves. From this we conclude that if an individual is a monarch, it is much more likely that their spouse is also a monarch, namely:

P=I am a person
I=I am a sovereign
S=My spouse is a sovereign
P(S|(I^P))=2784/4608=60.4%
P(S|P)=2784/110017=2.5%

We can also identify correlations between types and different types: for example, in the spouse relation, if the subject is of type "man", it is likely (but not certain) that the object is of type "woman", and it is very likely that the object is of type "person".

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
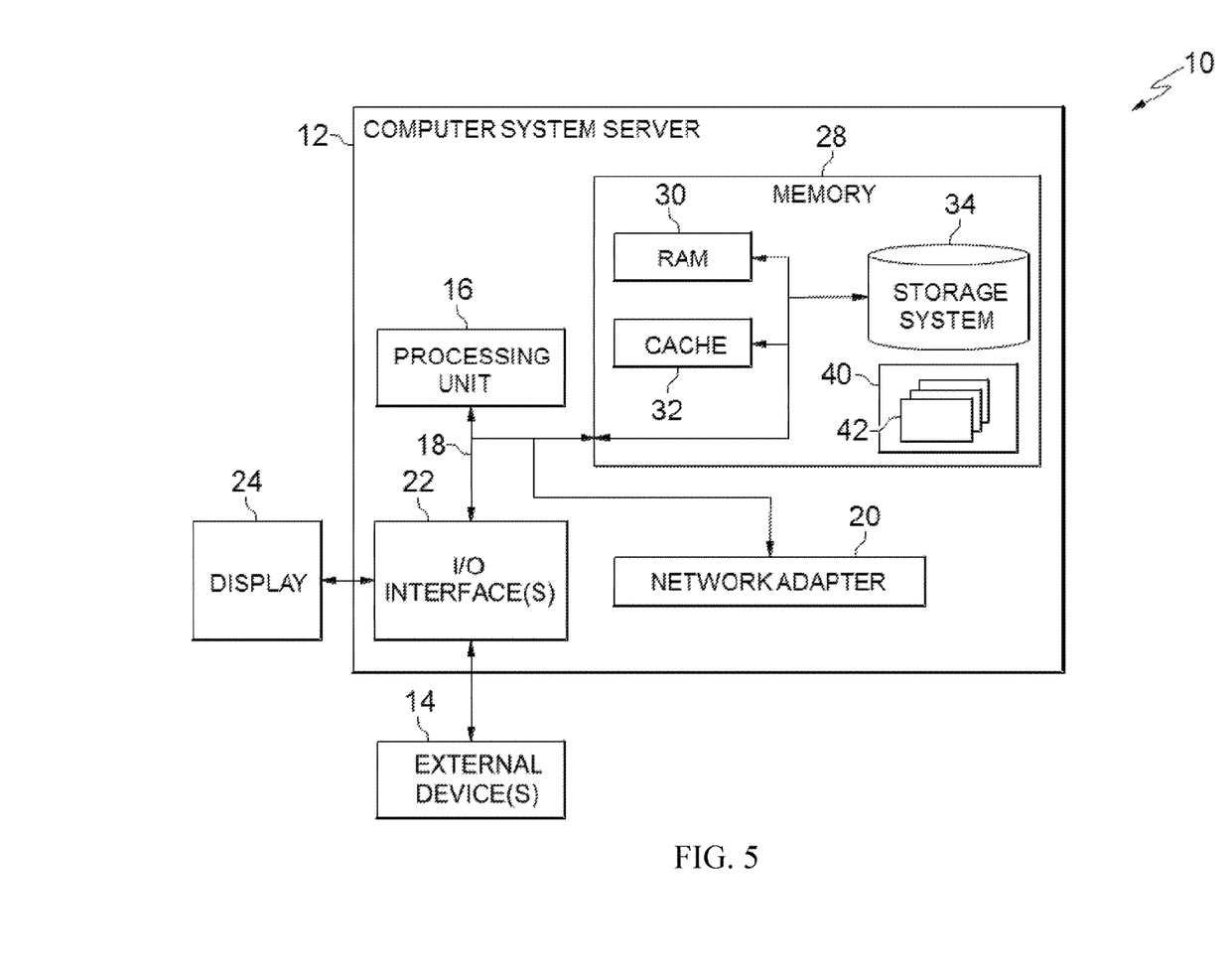
FIG. 5 is a block diagram depicting one example of a computing apparatus (e.g., cloud computing node) suitable for executing the methods disclosed herein.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
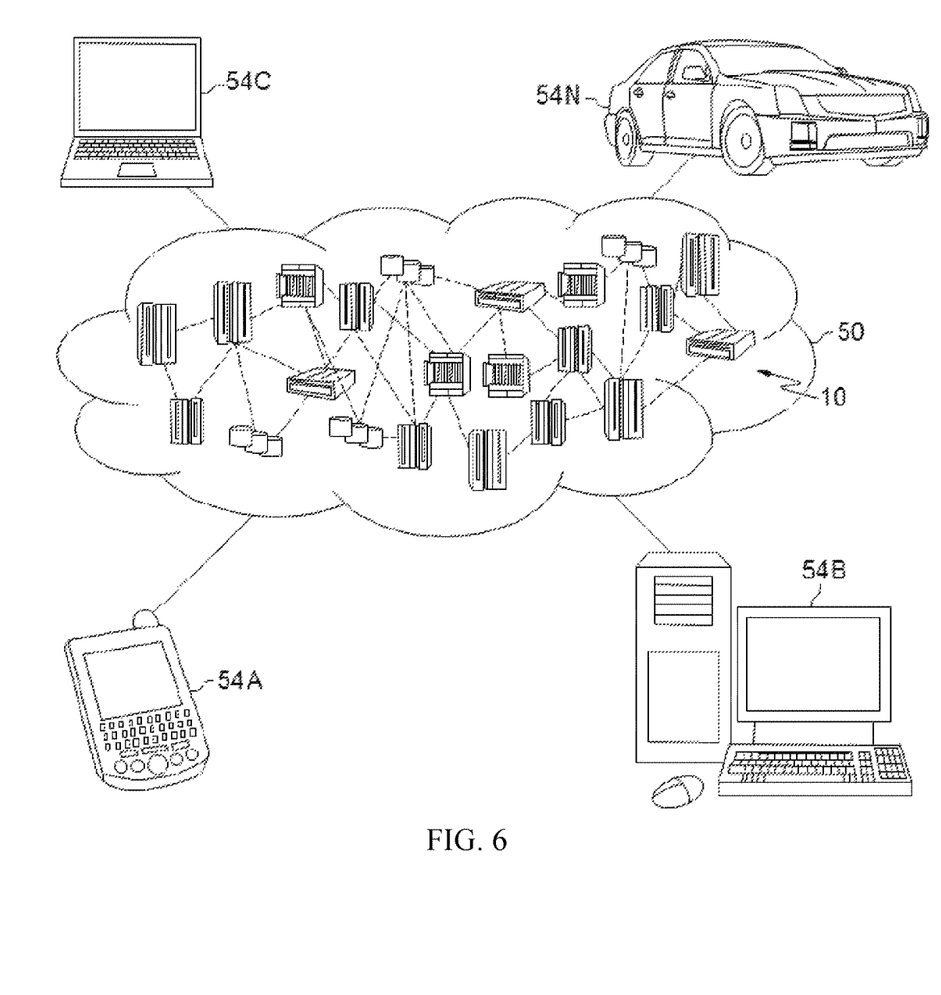
FIG. 6 depicts a cloud computing environment in accordance with to at least one embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
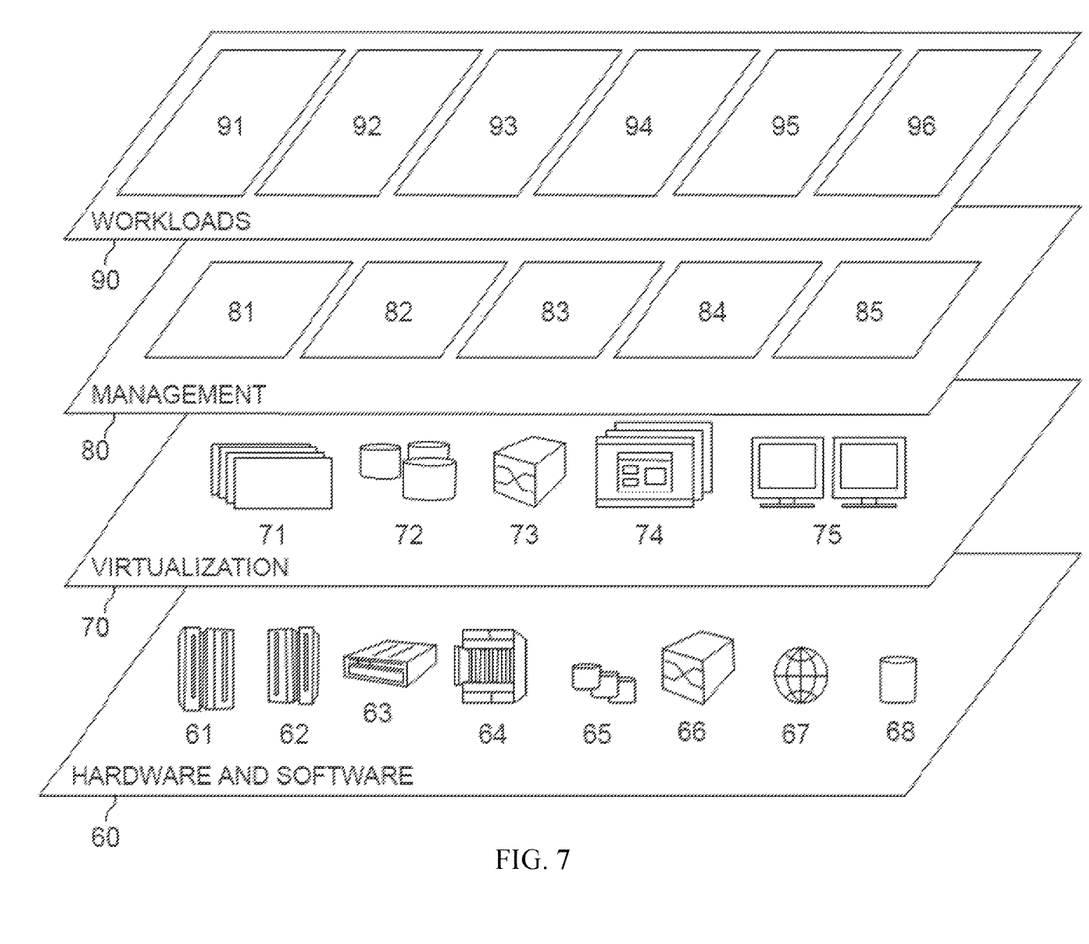
FIG. 7 depicts abstraction model layers in accordance with at least one embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A method, executed by one or more processors, the method comprising:
   in response to receiving a triple comprising a subject, a predicate, and an un-typed object, wherein the un-typed object is a string literal, scanning a database storing a collection of triples for triples that match the predicate of the received triple to identify similar triples;
   responsive to identifying an object of each similar triple, for each non-literal object identified, scanning the database storing the collection of triples for typing triples that (i) have a subject that matches a respective non-literal object and (ii) include a type predicate, thereby classifying objects of the typing triples as candidate data types for the un-typed object;
   identifying the candidate data types for the untyped-object;
   determining frequency information for each candidate data type based on a ratio of a count of the candidate data types to a count of the similar triples;
   associating the un-typed object with one or more candidate data types based on the frequency information; and
   processing the un-typed object based on the frequency information and the one or more candidate data types.

2. The method of claim 1, wherein the similar triples also match a subject type of the received triple.

3. The method of claim 1, further comprising determining a confidence score for a particular data type for the received triple from the frequency information.

4. The method of claim 1, wherein the frequency information comprises a count for one or more objects referenced by the similar triples.

5. The method of claim 1, wherein the frequency information comprises a percentage for one or more object types referenced by the similar triples.

6. The method of claim 1, wherein processing the un-typed object comprises candidate answer generation.

7. The method of claim 1, wherein processing the un-typed object comprises candidate answer evaluation.

8. A computer system comprising:
   one or more computer processors;
   one or more computer readable storage devices and program instructions stored on the one or more computer readable storage devices, the program instructions comprising instructions to perform:
   in response to receiving a triple comprising a subject, a predicate, and an un-typed object, wherein the un-typed object is a string literal, scanning a database storing a collection of triples for triples that match the predicate of the received triple to identify similar triples;
   responsive to identifying an object of each similar triple, for each non-literal object identified, scanning the database storing the collection of triples for typing triples that (i) have a subject that matches a respective non-literal object and (ii) include a type predicate, thereby classifying objects of the typing triples as candidate data types for the un-typed object;
   identifying the candidate data types for the untyped-object;
   determining frequency information for each candidate data type based on a ratio of a count of the candidate data types to a count of the similar triples;
   associating the un-typed object with one or more candidate data types based on the frequency information; and
   processing the un-typed object based on the frequency information and the one or more candidate data types.

9. The computer system of claim 8, wherein the similar triples also match a subject type of the received triple.

10. The computer system of claim 8, further comprising determining a confidence score for a particular data type for the received triple from the frequency information.

11. The computer system of claim 8, wherein the frequency information comprises a count for one or more objects referenced by the similar triples.

12. The computer system of claim 8, wherein the frequency information comprises a percentage for one or more object types referenced by the similar triples.

13. The computer system of claim 8, wherein processing the un-typed object comprises candidate answer generation.

14. The computer system of claim 8, wherein processing the un-typed object comprises candidate answer evaluation.

15. A computer program product comprising:
   one or more computer readable storage media and program instructions stored on the one or more computer readable storage media, the program instructions comprising instructions to perform:
   in response to receiving a triple comprising a subject, a predicate, and an un-typed object, wherein the un-typed object is a string literal, scanning a database storing a collection of triples for triples that match the predicate of the received triple to identify similar triples;
   responsive to identifying an object of each similar triple, for each non-literal object identified, scanning the database storing the collection of triples for typing triples that (i) have a subject that matches a respective non-literal object and (ii) include a type predicate, thereby classifying objects of the typing triples as candidate data types for the un-typed object;
   identifying the candidate data types for the untyped-object;
   determining frequency information for each candidate data type based on a ratio of a count of the candidate data types to a count of the similar triples;
   associating the un-typed object with one or more candidate data types based on the frequency information; and
   processing the un-typed object based on the frequency information and the one or more candidate data types.

16. The computer program product of claim 15, wherein the similar triples also match a subject type of the received triple.

17. The computer program product of claim 15, further comprising determining a confidence score for a particular data type for the received triple from the frequency information.

18. The computer program product of claim 15, wherein the frequency information comprises a count for one or more objects referenced by the similar triples.

19. The computer program product of claim 15, wherein the frequency information comprises a percentage for one or more object types referenced by the similar triples.

20. The computer program product of claim 15, wherein processing the un-typed object comprises candidate answer generation or candidate answer evaluation.

* * * * *